United States Patent
Gibbert

(10) Patent No.: US 12,371,147 B2
(45) Date of Patent: Jul. 29, 2025

(54) FAIRING ATTACHMENT SYSTEM FOR A WING OF AN AIRCRAFT, AIRCRAFT WING AND METHOD FOR MOUNTING A FAIRING DEVICE

(71) Applicant: Airbus Operations GmbH, Hamburg (DE)

(72) Inventor: Markus Gibbert, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 119 days.

(21) Appl. No.: 18/307,222

(22) Filed: Apr. 26, 2023

(65) Prior Publication Data

US 2023/0348039 A1 Nov. 2, 2023

(30) Foreign Application Priority Data

Apr. 28, 2022 (EP) ..................................... 22170667

(51) Int. Cl.
*B64C 7/00* (2006.01)
(52) U.S. Cl.
CPC ...................................... *B64C 7/00* (2013.01)
(58) Field of Classification Search
CPC .... B64C 7/00; B64C 9/16; B64C 9/18; B64C 9/20
See application file for complete search history.

(56) References Cited

U.S. PATENT DOCUMENTS

| | | | | | |
|---|---|---|---|---|---|
| 2,206,417 | A | * | 7/1940 | Mercier | B64D 33/08 244/55 |
| 2,557,426 | A | * | 6/1951 | George | B64C 13/00 244/82 |
| 3,706,431 | A | * | 12/1972 | Smith | B64C 9/16 244/216 |

(Continued)

FOREIGN PATENT DOCUMENTS

| | | |
|---|---|---|
| CN | 109278984 A | 1/2019 |
| EP | 0081610 A1 | 6/1983 |
| RU | 2394722 C1 | 7/2010 |

OTHER PUBLICATIONS

European Search Report for European Patent Application No. 22170667 dated Sep. 22, 2022; priority document.

*Primary Examiner* — Joshua J Michener
*Assistant Examiner* — Michael B. Kreiner
(74) *Attorney, Agent, or Firm* — Greer, Burns & Crain, Ltd.

(57) ABSTRACT

A fairing attachment system for a wing of an aircraft includes a high lift support structure configured to movably support a high-lift airfoil element of a wing of an aircraft relative to the wing. The system includes a fairing device extending in a lengthwise direction, configured to provide an aerodynamic housing of the high lift support structure when attached to a surface of the wing, and an adjustable attachment element configured to attach the fairing device to the high lift support structure. The adjustable attachment element is longitudinally extending and adjustable in length to (Continued)

compensate for tolerances of the high lift support structure relative to the wing during assembly. An aircraft wing includes the fairing attachment system. The fairing attachment system is used in a method for mounting a fairing device to a wing of an aircraft.

9 Claims, 3 Drawing Sheets

(56) References Cited

U.S. PATENT DOCUMENTS

| | | | | |
|---|---|---|---|---|
| 3,853,289 | A * | 12/1974 | Nevermann | B64C 9/20 244/215 |
| 4,431,149 | A * | 2/1984 | Brislawn | B64C 9/10 244/82 |
| 4,448,375 | A * | 5/1984 | Herndon | B64C 9/16 244/215 |
| 4,470,569 | A * | 9/1984 | Shaffer | B64C 9/22 244/214 |
| 4,712,752 | A * | 12/1987 | Victor | B64C 3/28 244/129.1 |
| 6,598,834 | B2 * | 7/2003 | Nettle | B64C 3/48 244/215 |
| 7,051,982 | B1 * | 5/2006 | Johnson | B64C 9/02 244/129.1 |
| 7,997,530 | B2 * | 8/2011 | Frisch | B64C 7/00 244/131 |
| 8,746,625 | B2 * | 6/2014 | Recksiek | B64C 9/16 244/215 |
| 8,931,733 | B2 * | 1/2015 | Dyckrup | B64C 9/02 244/45 R |
| 9,227,722 | B2 * | 1/2016 | Soenarjo | B64C 3/50 |
| 9,567,063 | B2 * | 2/2017 | Colaciti | B64C 9/18 |
| 9,856,014 | B2 * | 1/2018 | Osborn | B64C 7/00 |
| 9,926,069 | B2 * | 3/2018 | Havar | B64C 9/16 |
| 11,059,563 | B2 * | 7/2021 | Gruner | B64C 9/16 |
| 11,192,628 | B2 * | 12/2021 | Tsai | B64C 13/16 |
| 11,685,511 | B2 * | 6/2023 | Machunze | B64C 7/00 244/213 |
| 12,043,397 | B2 * | 7/2024 | Daandels | B64C 7/00 |
| 12,071,239 | B2 * | 8/2024 | Tulloch | B64C 9/16 |
| 2016/0340023 | A1 * | 11/2016 | Colaciti | B64C 9/18 |
| 2024/0343380 | A1 * | 10/2024 | Andreani | B64C 9/16 |

* cited by examiner

FAIRING ATTACHMENT SYSTEM FOR A WING OF AN AIRCRAFT, AIRCRAFT WING AND METHOD FOR MOUNTING A FAIRING DEVICE

CROSS-REFERENCES TO RELATED APPLICATIONS

This application claims the benefit of the European patent application No. 22170667.4 filed on Apr. 28, 2022, the entire disclosures of which are incorporated herein by way of reference.

FIELD OF THE INVENTION

The invention relates to a fairing attachment system for attachment of a fairing device to a wing of an aircraft, an aircraft wing, and a method for mounting a fairing device to a wing of an aircraft.

BACKGROUND OF THE INVENTION

Modern aircraft usually comprise wings having adjustable high lift airfoil devices which can be moved rotatably and translatory relative to the wing. Such high lift airfoil devices may be, e.g., flaps and/or flaperons, which combine the functions of flaps and ailerons. They are driven by adjustment mechanisms comprising high lift support structures, which are exposed to high loads during flight and usually project beyond the underside of the wing on which the adjustable high lift airfoil devices are arranged. The high lift support structures are aerodynamically enclosed or covered by fairing elements or devices. Typically, the high lift support structures are assembled to the wing with close tolerances.

The installation of the fairing to the wing is time consuming and thus leads to relatively high costs, as the position and the orientation of the high lift support structure relative to the wing needs exactly to be considered when the fairing is mounted. This is quite often particularly difficult because of the high number of connections to the wingbox.

SUMMARY OF THE INVENTION

It is an object of the invention to allow a quicker installation of a fairing to a wing, to provide high rates when equipping wings with flaps, and to reduce lead time.

The invention provides a fairing attachment system for a wing of an aircraft, the fairing attachment system comprising a high lift support structure configured for movably supporting a high-lift airfoil element of a wing of an aircraft relative to the wing; a fairing device extending in a lengthwise direction, configured for providing an aerodynamic cover or housing of the high lift support structure when attached to a surface of the wing; an adjustable attachment element configured for attachment of the fairing device to the high lift support structure, wherein the adjustable attachment element is longitudinally extending and adjustable in length in order to compensate tolerances of the high lift support structure relative to the wing during assembly.

The invention provides a fairing to wing connection which allows a quick installation of a fairing to a wing independently from the position and orientation of the high lift support structure relative to the wing. High rates capable of equipping the flap on the wing and reducing cost and lead time in the final assembly line are achieved. Moreover, the invention enables modular installation of high lift devices like, e.g., flaps and flaperons while minimizing the number of connections to the wingbox, thus reducing the complexity of installation. In particular, fairing installation independently from the high lift support structure is achieved. The fairing attachment system is designed for attachment of the fairing device to the aircraft.

The high lift support structure is, e.g., configured for movable attachment to the wing. In particular, the high lift airfoil element may, e.g., be a flap or a flaperon.

Preferably, the adjustable attachment element is configured for being pivotally mounted to the high lift support structure.

Preferably, at least a component of a pivot axis of the pivotally mounted adjustable attachment element extends in the lengthwise direction of the fairing device.

Preferably, the fairing attachment system further comprises a support element configured for supporting the fairing device at the wing at a position distant from the adjustable attachment element in the lengthwise direction of the fairing device.

Preferably, the support element provides a rotational degree of freedom, wherein the rotation axis of the support element corresponds to the pivot axis of the adjustable attachment element.

Preferably, a second pivot axis of the adjustable attachment element extends in the spanwise direction of the wing.

Preferably, the fairing attachment system further comprises a seal element configured for being mounted between the fairing device and the wing, the seal advantageously being compressible by adjustment of the adjustable attachment element, e.g., in order to control a gap between the fairing device and the wing.

Preferably, the fairing device comprises a fixed fairing element and a movable fairing element which can be moved by the high lift support structure, e.g., relative to the fixed fairing element, wherein the adjustable attachment element is preferably configured for attachment of the movable fairing element to the high lift support structure.

Preferably, the adjustable fairing element is configured as a strut for an aft attachment of the fairing device.

Preferably, the support element is configured as a bracket for providing a front attachment of the fairing device.

According to an aspect of the invention, an aircraft wing comprising a high lift airfoil arrangement, a fairing device and a fairing attachment system according to the invention is provided.

According to a further aspect of the invention, a method for mounting a fairing device to a wing of an aircraft is provided, wherein a fairing attachment system according to the invention is used.

BRIEF DESCRIPTION OF THE DRAWINGS

Embodiments of the invention are described in more detail with reference to the accompanying drawings. In the drawings.

DETAILED DESCRIPTION OF THE PREFERRED EMBODIMENTS

Figure 1:
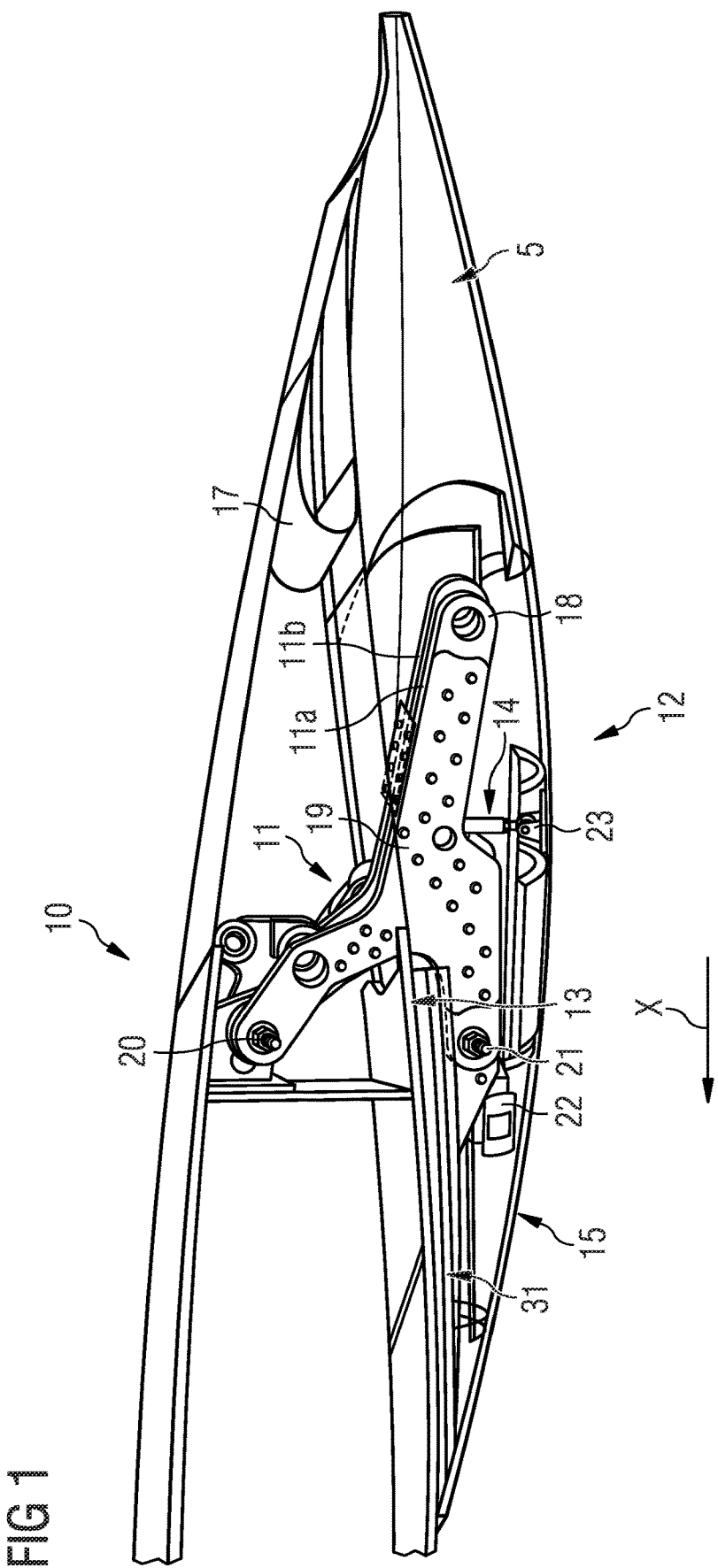
FIG. 1 depicts a wing section with a fairing attachment system according to a preferred embodiment of the invention, as a 3-dimensional partial cut view.

FIG. 1 depicts a section of a wing 10 comprising a fairing attachment system according to a preferred embodiment of the invention. The fairing attachment system comprises a high lift support structure 11, which is configured as a kinematic support rib and designed for supporting and moving a high lift airfoil element designed as a flap 17 of wing 10. It further comprises a fairing device 12 which forms an aerodynamic housing covering the kinematic support rib 11 at the underside 13 of wing 10. Further, the fairing attachment system comprises an adjustable attachment element 14 realized by a strut for attaching the fairing device 12 to the high lift support structure 11. The attachment element or strut 14 is longitudinally extending and adjustable in length in order to compensate tolerances of the high lift support structure 11 relative to the wing 10 during assembly.

The fairing device 12 extends in a lengthwise direction X which corresponds to the longitudinal axis of the aircraft and the wing 10. It comprises a fixed fairing element 15 which forms a forward portion of the fairing device 12, and a movable fairing element 16, which forms an aft portion of the fairing device 12.

The wing 10 comprises flap 17 as a high-lift airfoil element located at the trailing edge of the wing 10. Flap 17 is mechanically connected to the distal end 18 of an arm 19 of the kinematic support rib 11. The kinematic support rib 11 comprises a first fastener element 20 designed as a bolt and located at an end of support rib 11 opposite to the distal end 18. By the fastener element 20, kinematic support rib 11 is rotatably mounted within the wing 10. Support rib 11 comprises two support rib elements 11a, 11b formed as plates which are aligned parallel to each other with a distance between them.

The support rib 11 further comprises a second fastener element 21 designed as a bolt and located at a further portion of the arm 19 of support rib 11. By the second fastener element 21, the kinematic support arm 19 is rotatably mounted below the underside 13 of the wing 10. In this way, the distal end 18 of arm 19 is able to pivot around a pivot axis extending in the spanwise direction of the wing 10, i.e., arm 19 is pivotable around the longitudinal axis of bolt 20. Thus, flap 17 connected to the distal end 18 of the arm 19 is moved by the rotational movement of kinematic support rib 11, which is built as a double rib and driven by driving means not shown in the figure.

A support element 22 formed by a support bracket of the wing 10 is fixedly connected to the wing 10 and mechanically connects a portion of the fixed fairing element 15 to the wing 10, thus forming a forward attachment of the fixed fairing element 15. The forward attachment provides a rotational degree of freedom for the fixed fairing element 15, which will be explained in more detail further below. The wing fixed bracket 22 is installed during wing box assembly with close tolerances. The bracket 22 is used to attach the fairing by two bolts and serves as the forward attachment of the fixed fairing 15.

One end of strut 14 is attached to kinematic arm 19 of kinematic support rib 11 which is mechanically connected to the flap 17. The opposite end of strut 14 is attached to a support bracket 23 of the fixed fairing element 15, thus forming an aft attachment of the fixed fairing element 15. In this way, the fixed fairing element 15 is attached to the kinematic support rib 11 by strut 14.

The fairing bracket 23 or aft attachment of the fixed fairing element 15 is located at a position distant from the forward attachment 22 in the longitudinal direction X of the wing 10 and the aircraft.

Since the aft attachment of fixed fairing 15 is located on the kinematic support rib 11, the location of the support bracket 23 depends on the location of the kinematic support rib 11. Strut 14 installed at the aft attachment can be adjusted in length in order to compensate resulting tolerances of the high lift support rib 11 to wing assembly, i.e., during the final assembly line process. Thus, the final position of the fixed fairing element 15 is independent of the position of the kinematic support rib 11 which is usually installed with close tolerances.

A seal 31 located between fairing 15 and wing 10 is compressible by the adjustment of strut 14 in order to control a gap between fairing 15 and wing 10.

Figure 2:
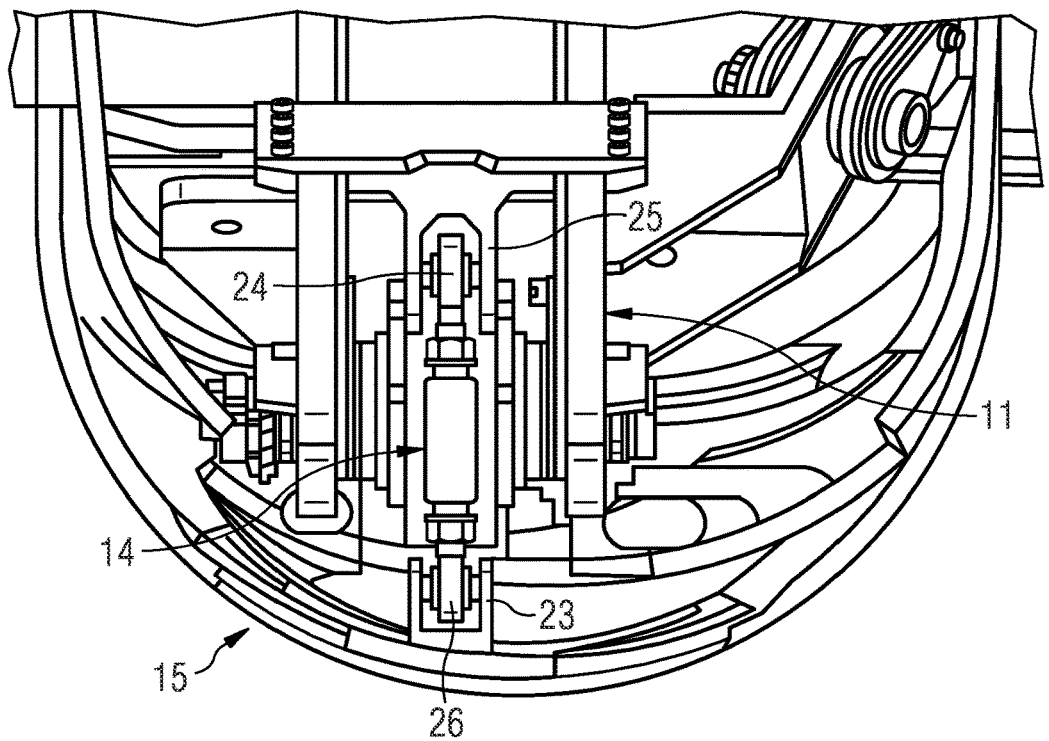
FIG. 2 depicts a front view of the fairing attachment system shown in FIG. 1, with a support rib in a nominal position.
Figure 3:
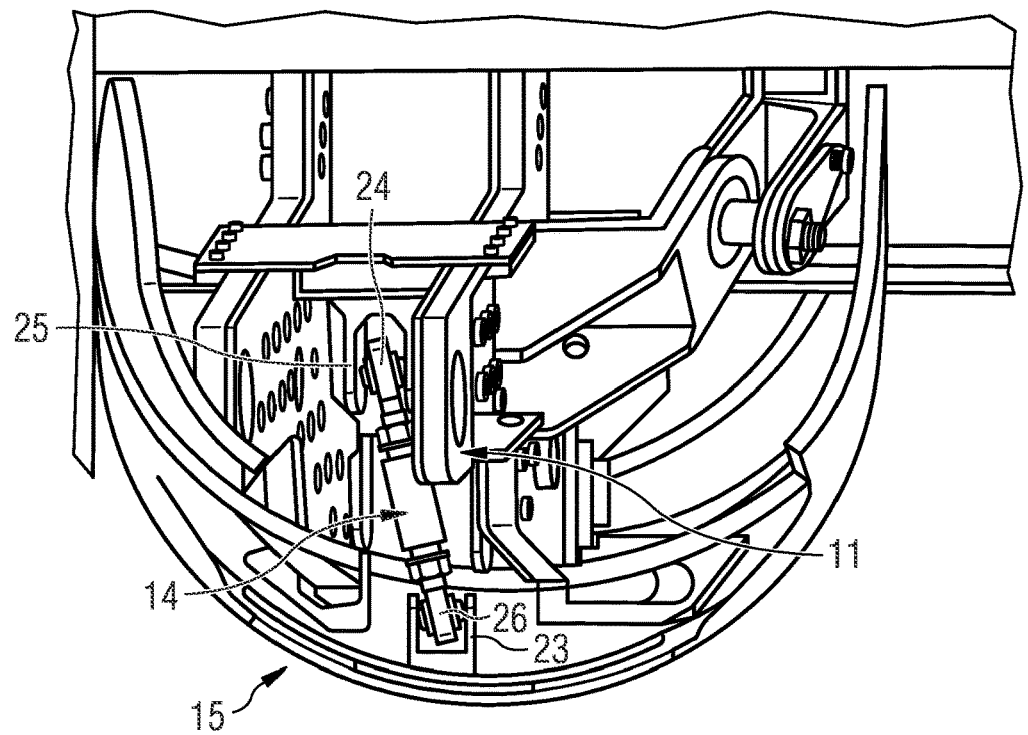
FIG. 3 depicts a front view of the fairing attachment system shown in FIG. 1, wherein the support rib is misaligned due to build tolerances.

Referring now to FIGS. 2 and 3 which depict the double kinematic support rib 11, the fixed fairing element 15 of fairing device 12, and the adjustable strut 14 attached to fixed fairing element 15 as a front view. FIG. 2 shows the kinematic support rib 11 in a nominal position, whereas FIG. 3 depicts the support rib 11 in a position where it is misaligned due to build tolerances. Both figures show the situation after installation of strut 14 in order to attach fixed fairing 15 to kinematic support rib 11.

When the support rib 11 is in its nominal position, strut 14 is installed with its nominal length, as can be seen from FIG. 2. However, when support rib 11 is misaligned due to build tolerances as shown in FIG. 3, strut 14 is adjusted in length.

Further, the end 24 of strut 14 attached to support rib 11 is pivotally installed in a support element 25 designed as a bracket and being part of support rib 11. Further, the opposite end 26 of strut 14 is also pivotally installed in support element or bracket 23 of the fixed fairing element 15.

Thus, strut 14 is able to pivot around pivot axes extending through support elements 23 and 25 perpendicular to the image plane of FIGS. 2 and 3, i.e., in the direction X indicated in FIG. 1, which corresponds to the longitudinal or forward direction of the wing 10 and the aircraft. Thus, strut 14 compensates an angular mismatch due to the misalignment of support rib 11.

Figure 4:
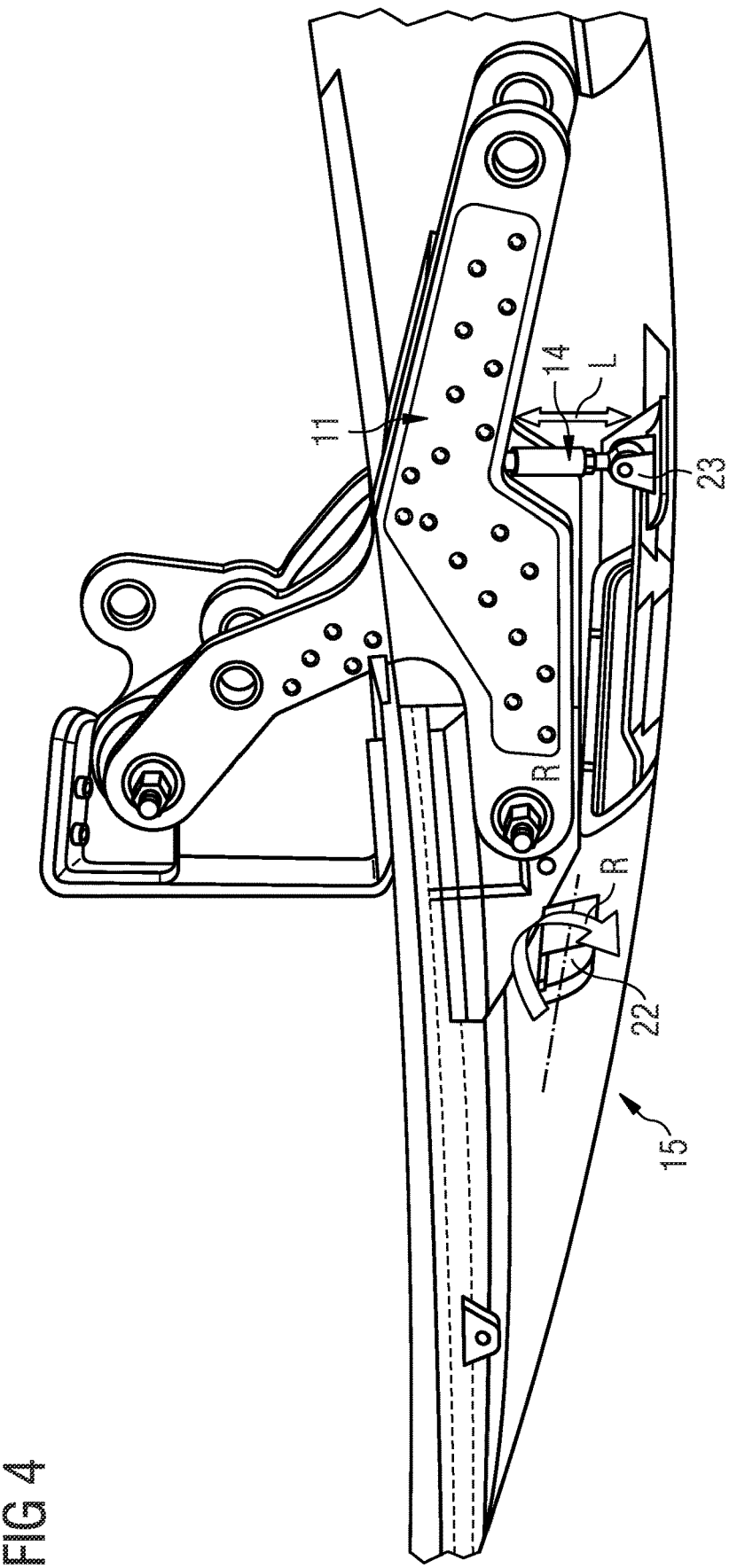
FIG. 4 depicts the fairing attachment system shown in FIG. 1, wherein a rotational degree of freedom provided by a support element and a length adjustment of an adjustable attachment element are indicated as arrows.

FIG. 4 shows the length adjustment L of the strut 14 attached to fixed fairing element 15 at one side and to kinematic support rib 11 at the opposite side, as well as the rotational degree of freedom R provided by the forward attachment 22 and by the aft attachment 23 of fixed fairing element 15.

For the description of the other parts and elements shown in FIGS. 3 and 4, reference is made to FIGS. 1 to 3.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE SIGNS 10 wing
11 high lift support structure
12 fairing
13 underside of the wing
14 adjustable strut
fixed fairing element
16 movable fairing element
17 flap
18 distal end
19 kinematic support arm
20 first fastener element
11a, 11b support rib elements
21 second fastener element
22 support element/bracket
23 support element/bracket
24 end of strut
25 support element/bracket
26 end of strut
31 seal
L length adjustment of strut
R rotational degree of freedom
X lengthwise/longitudinal direction

The invention claimed is:

1. A fairing attachment system for a wing of an aircraft, comprising:
   a high lift support structure configured for movably supporting a high-lift airfoil element of the wing of the aircraft relative to the wing;
   a fairing device extending in a lengthwise direction, configured to provide an aerodynamic housing of the high lift support structure when attached to a surface of the wing, wherein the fairing device comprises a fixed fairing element and a movable fairing element movable by the high lift support structure; and
   an adjustable attachment element configured to attach the fixed faring element to the high lift support structure, wherein the adjustable attachment element is longitudinally extending and adjustable in length to compensate for tolerances of the high lift support structure relative to the wing during assembly;
   wherein the adjustable attachment element is configured as a strut to attach to an aft attachment of the fixed fairing element.

2. The fairing attachment system according to claim 1, wherein the adjustable attachment element is configured to be pivotally mounted to the high lift support structure.

3. The fairing attachment system according to claim 2, wherein at least a component of a pivot axis of the adjustable attachment element extends in the lengthwise direction of the fairing device.

4. The fairing attachment system according to claim 3, wherein a second pivot axis of the adjustable attachment element extends in a spanwise direction of the wing.

5. The fairing attachment system according to claim 1, further comprising a support element configured to support the fairing device at the wing at a position distant from the adjustable attachment element in the lengthwise direction of the fairing device.

6. The fairing attachment system according to claim 5, wherein the support element provides a rotational degree of freedom, wherein a rotation axis of the support element corresponds to a pivot axis of the adjustable attachment element.

7. The fairing attachment system according to claim 5, wherein the support element is configured as a bracket to provide a front attachment of the fixed fairing element.

8. The fairing attachment system according to claim 1, further comprising a seal element configured to be mounted between the fixed fairing element and the wing, the seal element being compressible by adjustment of the adjustable attachment element to control a gap between the fixed fairing element and the wing.

9. An aircraft wing, comprising a high lift airfoil arrangement, a fairing device and a fairing attachment system according to claim 1.

* * * * *